Patented May 13, 1952

2,596,333

UNITED STATES PATENT OFFICE 2,596,333

DIETARY SALT SUBSTITUTE

Alfred Halpern and Clifford H. Bradney, New York, N. Y., assignors to E. Fougera & Co., Inc., New York, N. Y., a corporation of New York No Drawing. Application April 3, 1951, Serial No. 219,116

9 Claims. (Cl. 99—143)

This invention relates to a new product adapted to be used as a dietary substitute for sodium chloride and it has particular relation to a product of this type which contains as main ingredients potassium chloride and glutamic acid. The invention also relates to a method of preparing said new product.

The main object of this invention is to provide a dietary substitute for sodium chloride, which consists of individual particles having the taste, appearance and stability of table salt.

Another object of the invention is to provide a sodium chloride substitute of the before mentioned type which is capable of withstanding, without decomposition, temperatures encountered in the preparation, cooking, baking, etc. of food products.

A further object of this invention consists in providing a sodium chloride substitute of the before mentioned type, which has no irritating or other undesirable effect on the human organism.

It is also an object of the present invention to provide a simple and efficient process for combining the individual ingredients to the desired stable and homogeneous product.

Other objects and the advantages of the invention will be apparent from the appended claims and the following specification which describes, by way of example, some embodiments of the invention.

It has been known that patients resorting to sodium restricted diet, suffer from a lack of palatability of these diets. In order to counteract this effect, it has been suggested to use, as a substitute for table salt, various mixtures, with the object of imparting the flavor of table salt to the food. As examples of such substitutes, mixtures consisting of potassium chloride and ammonium chloride, or mixtures containing the ammonium salt of glutamic acid and/or other amino acids, may be mentioned.

A satisfactory dietary substitute for table salt must have the appearance, stability and lack of toxicity of sodium chloride. Furthermore, the substitute must duplicate the taste of sodium chloride and withstand temperatures used in the preparation of food, such as baking or cooking temperatures. It has been reported that potassium chloride and ammonium chloride have a disagreeable taste. Also it has been shown that the ammonium ion is an agent capable of stimulating the bronchial mucosa, causing a secretion of mucus and promoting coughing.

Another fact to be considered consists in that the ammonium ion is capable of disturbing the acid-base-balance of the blood and, therefore, is not a desirable agent to be taken over prolonged periods of time as a salt substitute.

Finally, it has been established that products containing the ammonium ion, may release ammonia under the conditions encountered in the cooking of foods and are, therefore, not suitable for use under such conditions.

It has now been found that a new product which meets the above mentioned requirements and is adapted to be used as a dietary substitute for table salt, can be obtained by coating particles of potassium chloride (KCl) with glutamic acid $(HOOC.CH(NH_2).CH_2.CH_2.COOH)$, and employing an inert binder in order to firmly attach the coating to the particles of potassium chloride. The coated particles thus formed do not show the taste of potassium chloride and they are stable and of crystalline, granular appearance, duplicating that of sodium chloride. As a result of the process according to the invention, the taste of the product obtained substantially duplicates that of sodium chloride, as demonstrated by the taste threshhold test. Thus, the properties of the product of the invention render it suitable for use in flavoring food products. Furthermore, because of its lack of ammonium ion, this product can be used for cooking purposes and imparts a desirable salinity to the foods.

In the following examples, the parts refer to parts by weight unless otherwise stated.

Example 1

83.3 parts of potassium chloride are heated to 100° C. and placed in a suitable mixing vessel fitted with a rotary stirring device. An aqueous liquid containing in solution, 2 parts of gum arabic, 14 parts of soluble starch and 0.08 part of glutamic acid, is heated to 70°–80° and sprayed onto the potassium chloride while the latter is being stirred. Stirring is continued until the potassium chloride particles are substantially completely dry. The product is forced through a #30 sieve and packaged.

Example 2

A mixture of 83.3 parts of potassium chloride with 14.8 parts of corn starch is mixed with an aqueous solution containing 0.08 part of glutamic acid and 2 parts of gum arabic. The mixture is agitated until it is damp dry. Hot air, of for example 70° C., can be blown over the particles of the mixture in order to complete drying. After the granules are dry, they are sieved and packaged.

Example 3

83 parts of potassium chloride are placed in a mixing vessel provided with a stirrer, heated to 80°–90° C., and a hot (80° C.) aqueous solution containing 1.0 part of Karaya gum and 0.08 part of glutamic acid, is uniformly applied by spraying to the potassium chloride particles under stirring. Further treatment is the same as in Example 1.

Example 4

83 parts of potassium chloride are treated with an aqueous solution of about 70° C., containing 0.085 part of glutamic acid in solution and 16.5 parts of starch, in the manner described in Example 1.

Example 5

83 parts of potassium chloride are treated with an aqueous solution of about 80° C., containing in solution 0.05 part of glutamic acid, 14 parts of soluble starch, and 2 parts of gum arabic, in the manner described in Example 1.

In the above examples carboxy-methyl cellulose (low viscosity) can be partly or entirely substituted for the gums and potato starch, and rice starch or glycogen or a mixture of these starches, can be partly or entirely substituted for the starches mentioned in the above examples. Furthermore, an equivalent amount of potassium or calcium glutamate can be partly or entirely substituted for the glutamic acid, in preparing the products of our invention. In carrying out our invention, the water is used in an amount sufficient for dissolving or dispersing the glutamic acid and the binder, and for obtaining a uniform coating on the potassium chloride particles.

The products obtained according to the above examples are homogeneous and show the following characteristics:

1. The products are crystalline colorless cubes, soluble in water, insoluble in alcohol, petroleum ether, acetone and chloroform;
2. The refractive index of the crystals is 1.4655;
3. The specific gravity of the crystals is 1.644 at 25° C.
4. The crystals contain in the average:

| | Per cent |
|---|---|
| Potassium | 43.50 |
| Chlorine | 39.48 |
| Nitrogen | 0.0073 |

The taste threshhold as determined by standard methods is $1 \times 10^{-5}$.

In carrying out our invention it is indispensable to form a homogeneous product consisting of individual particles having an adhering surface coating comprising the glutamic acid and binder. The preferred range of the amount of glutamic acid is 0.05 to 2.0%, based on the weight of the substantially dry end product of the invention. The amount of potassium chloride in the end product amounts preferably to 70 to 85%.

It will be understood that our invention is not limited to the specific details disclosed above and can be carried out with various modifications without departing from the scope of the invention, as defined in the appended claims. For example, methods other than those described above can be used for preparing the particles provided with a glutamic acid coating according to our invention. Furthermore, although the bulk of the product according to our invention always consists of potassium chloride, the latter can be used in combination with suitable admixtures, such as potassium formate, potassium citrate, calcium formate, calcium citrate, and magnesium citrate.

The term "particles" is used in the present specification and claims to denote particles corresponding in size to that of particles of standard table salt and passing for example through a sieve #30.

What is claimed is:

1. A dietary salt substitute for sodium chloride, said substitute being formed by individual solid particles, the bulk of which consists of potassium chloride, said particles being provided with a coating comprising an inert binder and a glutamic acid compound selected from the group consisting of glutamic acid, potassium glutamate and calcium glutamate.

2. A dietary salt substitute for sodium chloride, said substitute being formed by individual solid particles, the bulk of which consists of potassium chloride, said particles being provided with a coating comprising an inert binder and glutamic acid.

3. A dietary salt substitute as claimed in claim 2, containing 70 to 85% by weight of potassium chloride and 0.05 to 2.0% of glutamic acid.

4. A process for preparing a dietary salt substitute for sodium chloride, comprising mixing solid particles of potassium chloride with an aqueous fluid containing an inert binder and a dissolved glutamic acid compound selected from the group consisting of glutamic acid, potassium glutamate and calcium glutamate and evaporating water from the mixture, in order to form a coating on the potassium chloride particles.

5. A dietary salt substitute as claimed in claim 1 in which a gum is used as binding agent.

6. A dietary salt substitute as claimed in claim 1, in which a starch is used as binding agent.

7. A dietary salt substitute as claimed in claim 1, in which a mixture of gum and starch is used as binding agent.

8. A dietary salt substitute for sodium chloride, said substitute being formed by individual solid particles, each of said particles having a core consisting substantially of potassium chloride and a minor amount of an inert binder, said particles being provided with a coating consisting substantially of an inert binder and a glutamic acid compound selected from the group consisting of glutamic acid, potassium glutamate and calcium glutamate.

9. A dietary salt substitute for sodium chloride, said substitute being formed by individual solid particles, each of said particles having a core consisting substantially of potassium chloride, said particles being provided with a coating consisting substantially of an inert binder and a glutamic acid compound selected from the group consisting of glutamic acid, potassium glutamate and calcium glutamate.

ALFRED HALPERN.
CLIFFORD H. BRADNEY.

REFERENCES CITED

The following references are of record in the file of this patent:

UNITED STATES PATENTS

| Number | Name | Date |
|---|---|---|
| 2,471,144 | Davy | May 24, 1949 |
| 2,500,919 | Cahn | Mar. 21, 1950 |

FOREIGN PATENTS

| Number | Country | Date |
|---|---|---|
| 312,088 | Great Britain | May 8, 1930 |